US011436223B2

(12) United States Patent
Penmetsa et al.

(10) Patent No.: US 11,436,223 B2
(45) Date of Patent: Sep. 6, 2022

(54) QUERY PIN PLANNER

(71) Applicant: salesforce.com, inc., San Francisco, CA (US)

(72) Inventors: RamaLinga Raju Penmetsa, Rancho Cordova, CA (US); Prem Veeramani, Hayward, CA (US); Jeffrey Lallana Freschl, San Francisco, CA (US); Jesse Collins, Oakland, CA (US); Ganesh Maganti, San Jose, CA (US)

(73) Assignee: SALESFORCE, INC., San Francisco, CA (US)

( * ) Notice: Subject to any disclaimer, the term of this patent is extended or adjusted under 35 U.S.C. 154(b) by 732 days.

(21) Appl. No.: 15/419,509

(22) Filed: Jan. 30, 2017

(65) Prior Publication Data

US 2018/0218040 A1 Aug. 2, 2018

(51) Int. Cl.
*G06F 16/2453* (2019.01)

(52) U.S. Cl.
CPC .. *G06F 16/24542* (2019.01); *G06F 16/24547* (2019.01)

(58) Field of Classification Search
CPC ................ G06F 16/24542; G06F 16/24547
USPC .......................................................... 707/718
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |

(Continued)

*Primary Examiner* — Usmaan Saeed
*Assistant Examiner* — Jessica N Le
(74) *Attorney, Agent, or Firm* — Schwabe Williamson & Wyatt

(57) ABSTRACT

Systems, methods, and computer-readable media for pinning query execution plans are described. A database system may obtain a query, and determine a organization identifier and/or user identifier associated with the query. The database system may identify an optimized plan among a set of query plans that correspond with the query, and may generate a query execution plan based on the query and the optimized plan. The database system may determine a pinned plan that is associated with the optimized plan, and may generate a query execution plan based on the pinned plan when the pinned plan is associated with the optimized plan and corresponds with the organization identifier and/or the user identifier. The database system may generate a query execution plan using optimization functions when the pinned plan is not associated with the pinned plan, or the organization identifier and/or the user identifier. Other embodiments may be described and/or claimed.

4 Claims, 7 Drawing Sheets

(56) References Cited

U.S. PATENT DOCUMENTS

| | | |
|---|---|---|
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,244,714 B1 | 8/2012 | Collins et al. |
| 8,275,836 B2 | 9/2012 | Beaven et al. |
| 8,402,045 B2 | 3/2013 | Scotton et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,543,566 B2 * | 9/2013 | Weissman ........... G06F 16/2453 707/713 |
| 8,543,567 B1 | 9/2013 | Collins et al. |
| 8,566,301 B2 | 10/2013 | Rueben et al. |
| 8,577,918 B2 | 11/2013 | Collins et al. |
| 8,583,653 B2 | 11/2013 | Collins et al. |
| 8,646,103 B2 | 2/2014 | Jakobson et al. |
| 8,738,970 B2 | 5/2014 | Dutta et al. |
| 9,189,521 B2 | 11/2015 | Rajan et al. |
| 9,760,594 B2 | 9/2017 | Kim et al. |
| 9,811,444 B2 | 11/2017 | Freschi et al. |
| 9,854,039 B2 | 12/2017 | Salmon et al. |
| 9,946,751 B2 | 4/2018 | Eidson et al. |
| 9,953,054 B2 | 4/2018 | Collins |
| 10,152,511 B2 | 12/2018 | Rajan et al. |
| 10,192,169 B2 | 1/2019 | Gusev et al. |
| 10,262,027 B2 | 4/2019 | Colllins et al. |
| 10,268,721 B2 | 4/2019 | Dutta et al. |
| 10,372,934 B2 | 8/2019 | Mathur et al. |
| 10,409,697 B2 | 9/2019 | Chen et al. |
| 10,417,611 B2 | 9/2019 | Collins et al. |
| 10,452,630 B2 | 10/2019 | Tariq et al. |
| 10,545,962 B2 | 1/2020 | Collins et al. |
| 10,635,561 B2 | 4/2020 | Obembe et al. |
| 10,762,085 B2 | 9/2020 | Tariq et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Dice et al. |
| 2003/0189600 A1 | 10/2003 | Gune et al. |
| 2003/0204427 A1 | 10/2003 | Gune et al. |

(56) References Cited

U.S. PATENT DOCUMENTS

| | | |
|---|---|---|
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0225119 A1* | 9/2011 | Wong ................ G06F 16/219 707/609 |
| 2011/0247051 A1 | 10/2011 | Bulumulla |
| 2011/0282847 A1 | 11/2011 | Collins et al. |
| 2011/0282864 A1* | 11/2011 | Collins ............ G06F 16/24534 707/719 |
| 2012/0042218 A1 | 2/2012 | Cinarkaya |
| 2012/0084315 A1* | 4/2012 | Schneider ......... G06F 16/24558 707/769 |
| 2012/0233137 A1 | 9/2012 | Jakobson et al. |
| 2012/0290407 A1 | 11/2012 | Hubbard et al. |
| 2013/0151505 A1* | 6/2013 | Yoon .................. G06F 16/2453 707/718 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2013/0304723 A1* | 11/2013 | Konik ............... G06F 16/24561 707/718 |
| 2014/0172833 A1* | 6/2014 | Taylor ............... G06F 16/24534 707/722 |
| 2014/0359537 A1 | 12/2014 | Jackobson et al. |
| 2015/0169686 A1* | 6/2015 | Elias ................. G06F 16/24542 707/718 |
| 2015/0379076 A1* | 12/2015 | Grosse ............... G06F 16/2448 707/718 |
| 2016/0147835 A1 | 5/2016 | Collins et al. |
| 2016/0154850 A1* | 6/2016 | Bornea ............. G06F 16/24545 707/718 |
| 2017/0017689 A1* | 1/2017 | Scheibli ............ G06F 16/2453 |
| 2017/0147639 A1* | 5/2017 | Lee .................. G06F 16/24539 |
| 2018/0107711 A1 | 4/2018 | Tariq et al. |
| 2018/0210910 A1 | 7/2018 | Collins et al. |
| 2018/0218020 A1 | 8/2018 | Dutta et al. |
| 2019/0108248 A1 | 4/2019 | Rajan et al. |
| 2019/0236174 A1 | 8/2019 | Weber et al. |
| 2019/0363928 A1 | 11/2019 | Obembe et al. |
| 2020/0012645 A1 | 1/2020 | Collins et al. |

* cited by examiner

Schema:

```
<setupEntity name="PinPlan"
  keyPrefix="0Gk"
  userAccess="isSFDCAdmin;isDevInternal;UserType.SFDC_ADMIN"
  owner="Core Optimizer"
  editAccess="isSFDCAdmin;isDevInternal;UserType.SFDC_ADMIN"
  apiAccess="isDevInternal"
  javaPackageRoot="common.config.entity"
  filterType="PinPlan"
  supportedPageTypes="EDIT,DETAIL,LIST"
  genView="true"
  comment="pin a sfdc plan for a sqlId">
  <setupField name="SqlId" slot="0" columnType="TEXT" maxLength="30" dbValueRequired="true" comment="sqlid"/>
  <setupField name="UserId" slot="1" columnType="TEXT" maxLength="15" comment="userid"/>
  <setupField name="FilterUniqueIdentifier" slot="25" columnType="TEXT" maxLength="765" dbValueRequired="true"/>
  <setupField name="NoOfTimesUsed" slot="3" columnType="INTEGER"/>
  <setupField name="QueryIdOrSqlText" slot="26" columnType="TEXT" maxLength="4000" supportsUTF8="false"/>
  <setupField name="SqlText" slot="27" columnType="TEXT" maxLength="4000" supportsUTF8="false"/>
  <flexIndex indexNum="-1" fieldName="SqlId" field2Name="UserId" unique="true"/>
  <layout>
    <item field="SqlId" uiRequired="always"/>
    <item field="UserId"/>
    <item field="FilterUniqueIdentifier" uiRequired="always"/>
    <item field="NoOfTimesUsed"/>
    <item field="QueryIdOrSqlText"/>
    <item field="SqlText"/>
  </layout>
</setupEntity>
```

*FIGURE 6*

QUERY PIN PLANNER

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to query optimization, and in particular to generating and executing query plans in database systems.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields.

Generally, a query optimizer implemented by a database system, such as a multi-tenant database system, may obtain a user-issued query and generate a query execution plan. To generate the query execution plan, the optimizer may normalize the user-issued query, which may include breaking the user-issued query into multiple fine-grained queries. After the optimizer normalizes the query, the optimizer may choose a query plan that is determined to cost the least based on internal metrics (e.g., estimated memory requirements, processor utilization, number of required input/output (I/O) operations, etc.) However, the optimized plan may not be the most "optimal" or cost effective plan for a user-issued query. As a result, in some cases, the query optimizer and/or database system as a whole may end up wasting computational resources when using a query execution plan generated from the optimized plan. In such cases, a user, organization developer, or database system administrator may have determined an optimal path for a certain user-issued query, and may simply instruct the optimizer to use this path rather than the optimized plan to generate a query execution plan for the user-issued query (also referred to as "forcing the pinned plan", etc.).

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 6 illustrates an example schema for the example user interfaces of FIG. 5.

DETAILED DESCRIPTION

Figure 1A:
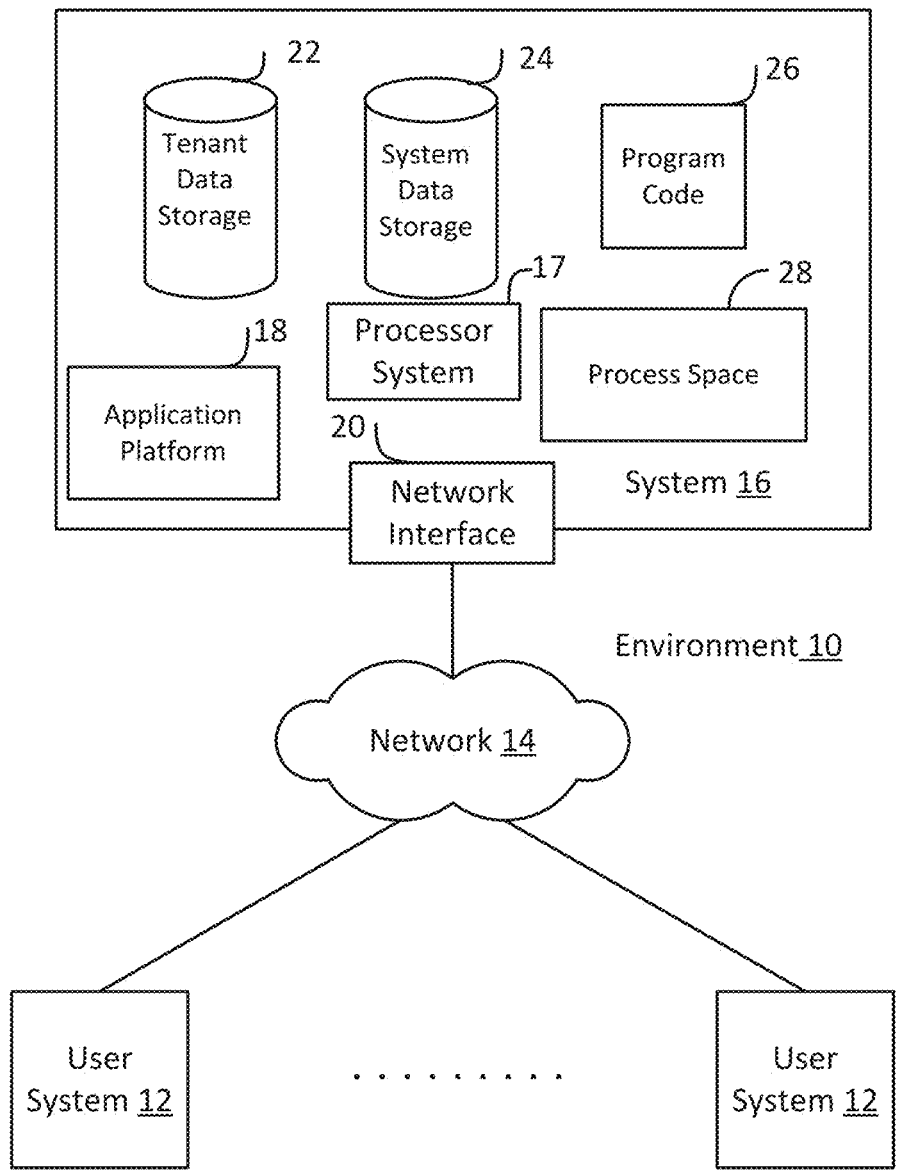
FIG. 1A shows a block diagram of an example environment in which an on-demand database service can be used according to some implementations.

Embodiments discussed herein are directed to pinning query plans. Generally, a query optimizer implemented by a database system may obtain a user-issued query and generate a query execution plan. To generate the query execution plan, the optimizer may normalize the user-issued query, which may include breaking the user-issued query into multiple fine-grained queries. After the optimizer normalizes a query, the optimizer may choose a query plan that it determines would cost the least based on internal metrics (e.g., estimated memory requirements, processor utilization, number of required I/O operations, etc.) However, in some cases the chosen query plan or optimized plan may not be the most "optimal" or cost effective plan for a user-issued query. In some cases, after performing the aforementioned optimization operations resulting in an optimized plan for a user-issued query, the optimizer may replace the optimized plan with a pinned plan (also referred to as forcing the pinned plan, etc.). In these cases, an organization developer or database system administrator may have determined an optimal path for a certain user-issued query, and may simply instruct the optimizer to use this path rather than generating an optimized path. This may be referred to as "pinning a plan" and the like. Various embodiments discussed herein may allow certain users (e.g., system administrators and/or organization developers) to select pinned plans to be used for selected queries issued by specific users and/or specific organizations. This may be accomplished using a multi-tenant tool or user interface, which may be referred to as a "pin planner." Embodiments also provide that the pin planner may be used to pin plans that are more cost effective than optimizer's optimized plan. In this way, the pin planner may be used to force a query optimizer to use a pinned plan for a specified user-issued query instead of an older optimized plan for that query.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks" have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium®, processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
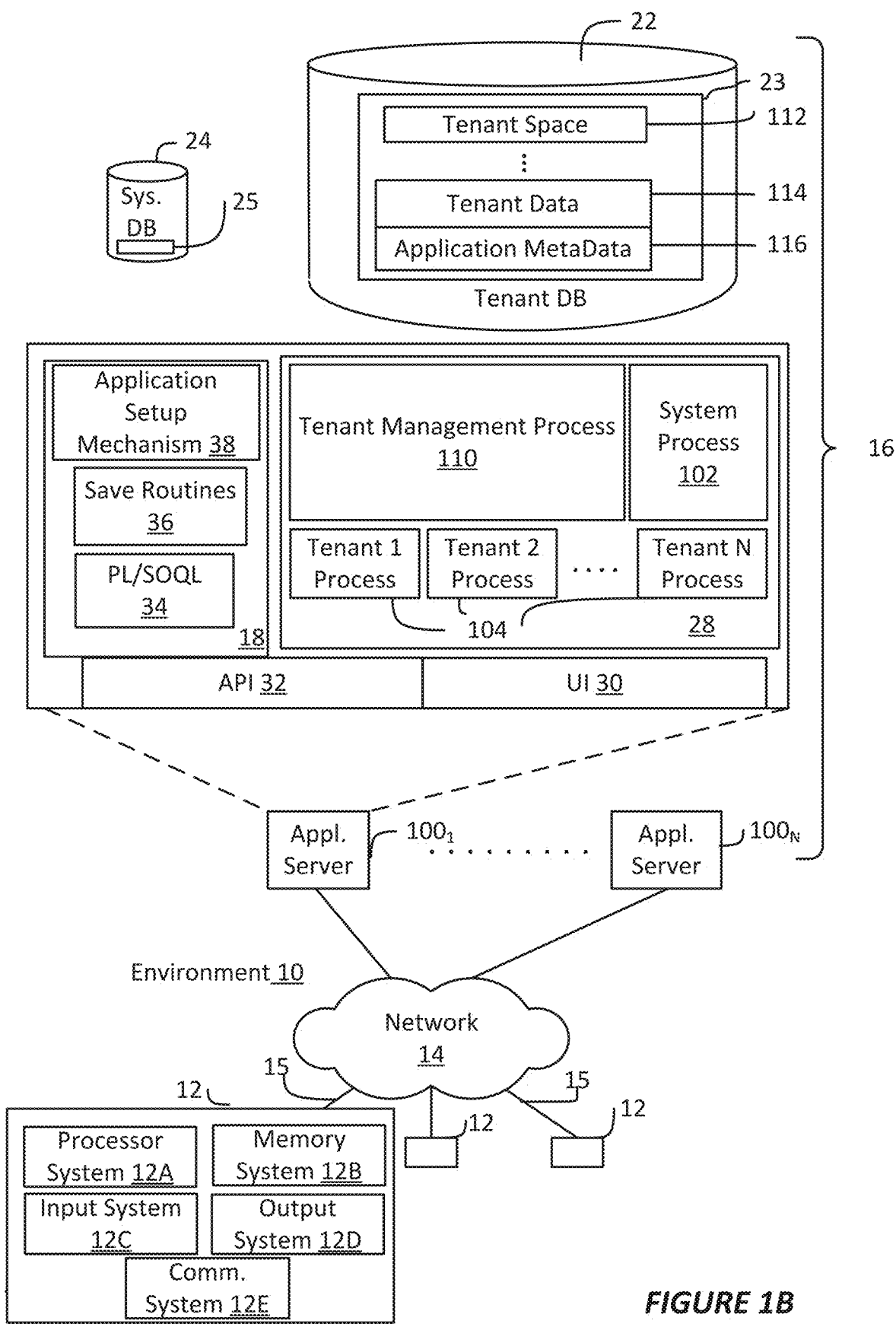
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors, one or more graphics processing units (GPUs), one or more field-programmable gate arrays (FPGAs), or any other electronic circuitry capable of executing program code and/or software modules to perform arithmetic, logical, and/or input/output operations. The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100) can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
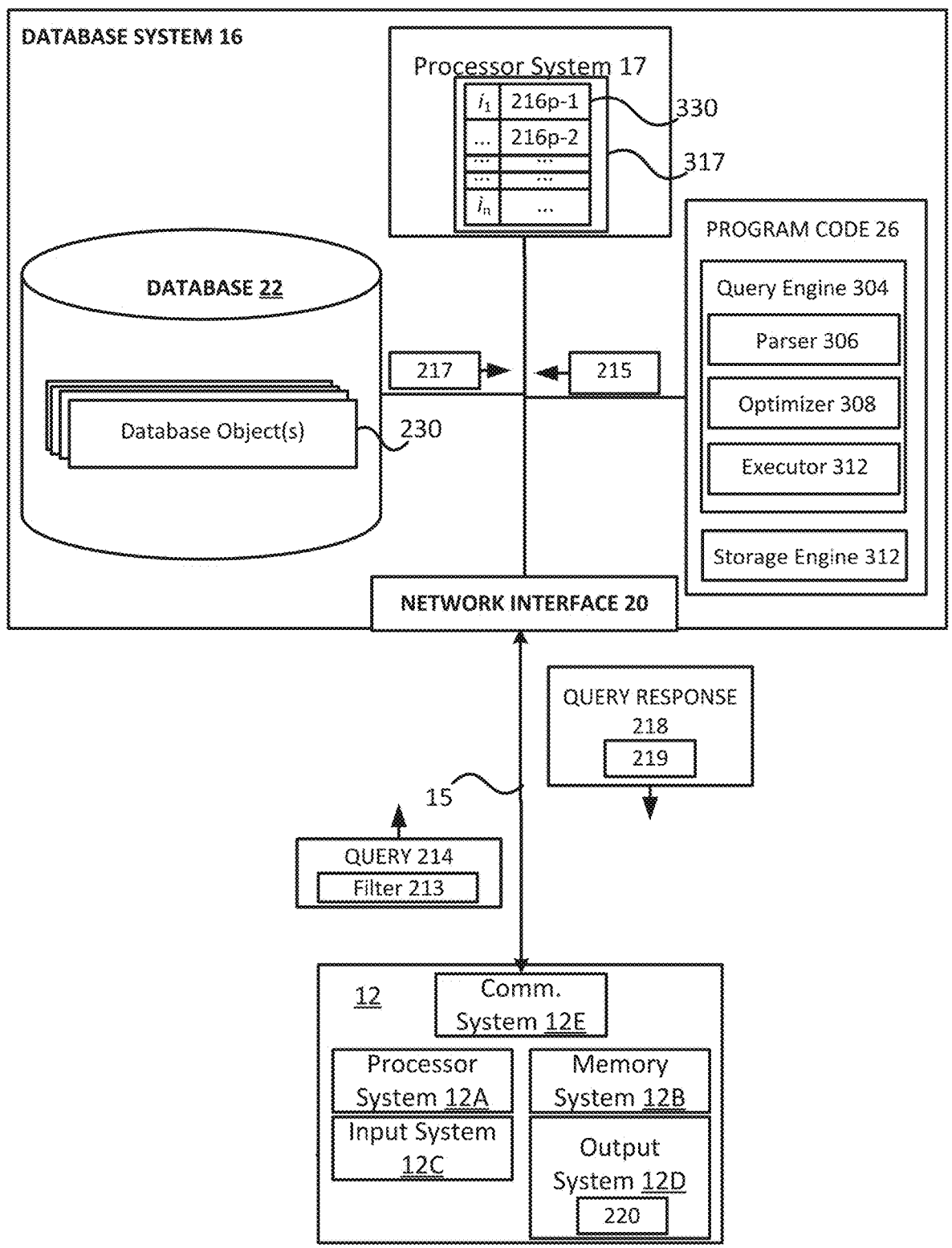
FIG. 2 shows an arrangement in which components of a user system interact with components of a database system in accordance with various embodiments.

FIG. 2 shows an arrangement 200 in which the components of a user system 12 interact with components of the database system 16, in accordance with various example embodiments. As shown, the user system 12 may include the processor system 12A, the memory system 12B, the input system 12C, the output system 12D, and the communications system 12E discussed previously with regard to FIGS. 1A and 1B. The database system 16 may include the processor system 17, the network interface 20, the database 22, and the program code 26 as discussed previously with regard to FIGS. 1A and 1B.

Referring to the user system 12, the memory system 12B may include an operating system (OS), one or more databases, and one or more applications (not shown). The processor system 12A may implement an application to generate and send query 214 (also referred to as a "user-issued query 214" and the like) to the database system 16. The query 214 may be a request for one or more data values, records, and/or fields stored in database object(s) 230 of database 22. The query 214 may include one or more targets indicating tables or records to be searched, one or more conditions indicating properties of the records to be returned, one or more as filters 213 indicating elements of the records to be returned (e.g., particular data values or fields within a table), as well as one or more other options (e.g., sort parameters, maximum result size, and the like). The one or more applications that enable querying of the database 22 may utilize any suitable querying language to query and store information the database 22, such as structured query language (SQL), object query language (OQL), Salesforce® OQL (SOQL), Salesforce® object search language (SOSL), and/or other like query languages. Such an application may be designed to run on a specific platform, such as when the user system 12 is implemented in a mobile device, such as a smartphone, tablet computer, and the like. In some embodiments, the owner/operator of database system 16 may have pre-built the application for use by agents of an organization/tenant, and a user of the user system 12 may be an agent of the organization/tenant. Furthermore, such applications may also enable the user system 12 to provide authentication credentials (e.g., user identifier (user_id), password, personal identification number (PIN), etc.) to the database system 16 so that the database system 16 may authenticate the identity of a user of the user system 12. Suitable implementations for the OS, databases, and applications, as well as the general functionality of the user system 12 are known or commercially available, and are readily implemented by persons having ordinary skill in the art, particularly in light of the disclosure herein.

In embodiments, the query 214 may be an HTTP message, where query commands and/or filters 213, a user identifier (user_id) of the user system 12, and/or an org_id associated with the user system 12 may be located in the header or body portion of the HTTP message. Other message types may be used to convey the query 214, such as a Session Initiation Protocol (SIP) message, or any of the Internet protocol messages discussed with regard to FIGS. 1A-1B. The filters 213 may be located in the header or body portion of such messages.

Referring to the database system 16, the processor system 17 may include a cache 317, which may be embodied as any type of cache memory that the processor system 17 can access more quickly than the program code 26 for storing instructions and/or data for execution, such as an on-die cache, an on-processor cache, an off-die cache, etc. In embodiments, the cache 317 may store one or more generated query plans.

Program code 26 may include a query engine 304 and a storage engine 312, in addition to program code used for implementing the various functions of the database system 16. The query engine 304 may include a parser 306, a query optimizer 308 (also referred to as "optimizer 308", "query builder 308", "builder 308", and the like), and query executor 310 (also referred to as "executor 310" and the like). In various embodiments, the query engine 304 may include one or more additional components not shown by FIG. 2, such as a query manager, a database manager, and the like. The program code 26, including program code of the query engine 304 (including the parser 306, optimizer 308, and executor 310) and storage engine 312 may be executed by the processor system 17. In response to execution of the program code 26, the database system 16 may implement or perform the various tasks, operations, procedures, processes, etc. of the example embodiments discussed herein. For example, execution of the program code 26 may cause the database system 16 to perform the processes 400 and 500 discussed with regard to FIGS. 3-4.

In embodiments, the query engine 304 (also referred to as a "query processor 304", "relational engine 304", and the like) may be program code that obtains a query 214 (e.g., from user system 12 via the network interface 20), translates the query 214 into a native query statement (e.g., query 215), evaluates and executes the translated query 215, and returns results of the query 214 (e.g., query response 218) back to the issuing party (e.g., user system 12). To perform these functions, the query engine 304 may include the parser 306, the query optimizer 308, and the executor 310, as well as other components that are not shown by FIG. 2, such as a parser, SQL manager, database manager, and/or other like components.

The parser 306 may be program code that may handle user-issued queries 214 sent to the database system 16. The parser 206 may check the queries for proper syntax, and may also issue syntax error(s) when a query includes syntax that is not recognized by the parser 306. The parser 306 may also translate commands in the queries into an internal format that can be operated on by other components of the query engine 304 and/or database system 16. The output of the parser 306 may be a query tree (also referred to as a "parse tree", a "sequence tree", etc.). The query tree may represent logical steps used to execute a user-issued query 214. Once generated, the query tree may be provided to the query optimizer 308.

The query optimizer 308 (also referred to as an "optimizer", "query builder", and the like) may be program code that may analyze user-issued queries submitted to the database system 16 (e.g., query 214), and determine how that query should be executed based on one or more selected query plans. A query plan may indicate one or more access paths and/or an order of operations used to access data in database objects 230. In some embodiments, the optimizer 308 may generate the query plan(s) based on obtained statistics, which the database system 16 may generate and maintain against indexes and/or fields explicitly for use by the optimizer 308. Some statistics for a given query 214 may be stored in a database object called a query profile (also referred to as an "SQL profile"). A query profile may include statistics for one or more query statements including database objects, fields, and/or records referenced by the query statements. Additionally, the optimizer 308 may use environment information when selecting an execution plan, which may include database configurations, bind variable values, optimizer statistics. The optimizer statistics may include database object statistics indicating table access costs, cardinality, etc., index statistics indicative of whether to perform index scans or full table scans; system statistics such as processor, memory, network, and I/O performance; and column statistics such as number of column values, number of nulls, etc.

In embodiments, the optimizer 308 may apply one or more query models to the query tree (obtained from the parser 306) and the statistics to determine an optimal access path, procedure, method, process, etc. to execute the query. The optimal access path, procedure, method, process, etc. to execute the query may be the query plan (also referred to as a "query execution plan", "execution plan", "optimized plan", etc.). Furthermore, the decisions made by the optimizer 308 may be based on a calculation of costs for a particular execution plan in terms of required processor resources, memory utilization, I/O operations, network resources, and the like. In such embodiments, the optimizer 308 may generate and evaluate multiple query plans and may choose a lowest-cost plan, which may be a query plan that executes faster than other query plans and/or uses the least amount of resources compared to resources used by other query plans. Selection of a query plan may also involve using the lowest amount of iterations as possible (e.g., spending the least amount of time within the processor system 17). The various decisions made by the optimizer 308 may be referred to as "optimization functions", "optimization procedures", and the like.

In various embodiments, the optimizer 308 may perform the various optimization functions discussed previously to identify a set of query plans for the user-issued query 214 and select an optimized plan from among the set of query plans. According to various embodiments, system administrators (also referred to as "black tab users"), organization database/application developers, etc. may select or "pin" any alternative plan among the set of query plans considered by the optimizer 308 for the user-issued query 214. The pinned plans 216p may be used for one or more queries issued by specific users (e.g., user systems 12 associated with a specific user_id) and/or a specific organization (e.g., user systems 12 associated with a specific org_id). Thus, a pinned plan 216p may be user and/or organization specific, such that a pinned plan 216p associated with a first user or organization may not be used for queries issued by a second user or organization. In some cases, the pinned plans 216p may be referred to as "indexed filters". "indexed paths", and the like.

Figure 5:
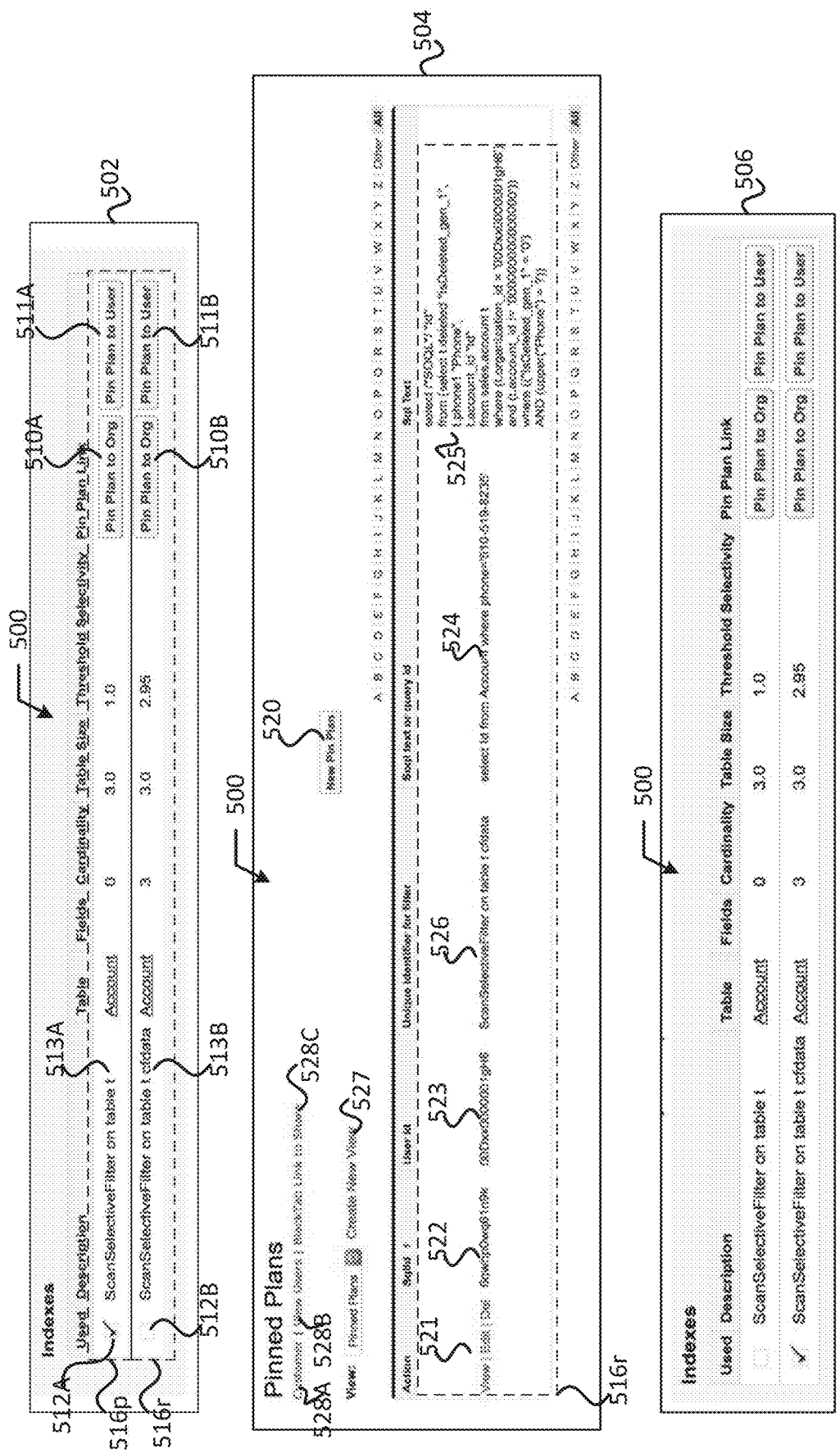
FIG. 5 illustrates various instances of an example graphical user interface for associating pinned plans with users and/or organizations in accordance with various embodiments.

In embodiments, the pinned plans 216p may be selected and associated with specific queries 214 using a multitenant tool or GUI, which may be referred to as a pin planner (see e.g., FIG. 5). The act of associating a pinned plan 216p with a specified query 214 may be referred to as "pinning a plan" or "pinning". In embodiments, the pin planner may be used to pin query plans that are more cost effective than an optimized plan that is generated according to the optimization functions discussed previously for a user-issued query.

The optimizer 308 may use a suitable hash function to determine whether a pinned plan 216p associated with an optimized plan for a user-issued query 214 exists in the cache 317. In embodiments, the cache 317 may include a database object 330 (or table "330") of cached pinned plans 216p. The optimizer 308 may perform a hash operation on a key of a key-value pair to obtain a query index i (e.g., $i_1$ to $i_n$ in FIG. 2). In embodiments, the key may be a combination of an org_id, user_id, and sql_id corresponding to the user-issued query 214. The optimizer 308 may obtain the sql_id as a result of analyzing and/or processing the optimized plan of a user-issued query 214 along with a user_id and org_id of the user-issued query 214. For example, the optimizer 308 may input the statements (e.g., character values) of the optimized plan for query 214 into a hash function to obtain the sql_id for the query 214. In some embodiments, the inputs to the hash function may also include the user_id and/or org_id, or portions thereof, thereby making the key/value pair user and/or organization specific.

In embodiments, the query index obtained by hashing the key may indicate a memory location and/or a database element in database object 330 storing the value of the key-value pair. The value stored at the database element may be a pinned plan 216p. As an example, and with reference to FIG. 2, the optimizer 308 may perform a hash operation on an sql_id to obtain a query index $i_1$, where the index it may indicate a database element storing a pinned plan 216p-1. The optimizer 308 may then obtain the pinned plan 216p-1 from the database element and use the pinned plan 216p-1 to generate the native query 215 rather than using an optimized plan derived from the previously described optimization functions. In some embodiments, the database object 330 may also store user_ids and/or org_ids in association with each pinned plan 216p (not shown by FIG. 2). In such embodiments, the optimizer 308 may only obtain a pinned plan 216p from the database object 330 to generate the native query 215 when the org_id and/or user_id is also associated with the pinned plan 216p.

The optimizer 308 may also translate the query 214 into an executable form (e.g., native query 215) using a query plan. The native query 215 may be a query that includes statements that can be directly executed in database 22. The conversion of the query 214 into the native query 215 may include, for example, replacing the original commands and filter expressions(s) 213 in the user-issued query 214 with new logically equivalent commands/filter expressions for the native query 215. Logically equivalent queries may be queries that may produce the same result even though they may have different format, conditions, filters, syntax, etc. Once generated, the query optimizer 308 may provide the query 215 to the query executor 310 for execution.

The query executor 310 may be program code that runs the query execution plan produced by the optimizer 308. The query executor 310 may provide execution operations for the query 215 to the storage engine 312. The storage engine 312 may be program code that accesses database object(s) 230 according to the execution operations provided by the executor 310. In embodiments, the execution operations may include identifying primary keys for one or more fields in the database object(s) 230 based on the conditions and filter values in the query 215; identifying, based on the indexes associated with the identified fields, individual records in the database object(s) 230 that include the primary keys in the identified fields; and obtaining the individual records from the database object(s) 230. In embodiments, identifying the primary keys may include obtaining index data (which may be custom index data) and/or primary key data from an index table in response to issuing the query 215 against the database object(s) 230.

The database object(s) 230 may store various data for a particular organization (org) or tenant, and may be located in the tenant space 23 (see e.g., by FIG. 1B). In embodiments, the database objects 230 may comprise an additional set of one or more columns or fields that may be custom columns or custom fields, which allow a system administrator for an org to define additional fields that are not included in a pre-defined set of fields. In addition, the system administrator may flag or otherwise select one or more custom fields to be used as an indexing field. When a custom field is flagged or otherwise selected for indexing, the data in the selected column may be copied into an index field of an index table associated with the database objects 230.

Referring back to FIG. 2, in response to the query 215, the database 22 may return a response 217 that includes data values from one or more database objects 230 as specified by the query 215. The query engine 304 may generate a query response 218 based on the response 217. The query response 218 may be any type of Internet protocol message, such as those discussed previously. The query response 218 may include a user interface data 219, which may include the data values obtained from the database 22 and information to be used by the user system 12 to generate and display one or more visual representations of the data values. The user interface data 219 may comprise various data objects in a computer-readable form that can be compiled and rendered as a visual representation 220 by the output system 12D. For example, the user interface data 219 may be one or more Extensible Markup Language (XML) documents, one or more JavaScript Object Notation (JSON) documents, and/or some other suitable data format that may be decoded and rendered by a browser implemented by the user system 12. Once the query response 218 is received by the user system 12, the processor system 12A may implement an application to extract the user interface data 219 from the query response 218 and generate a visual representation 220, which may be displayed using the output system 12D.

Figure 3:
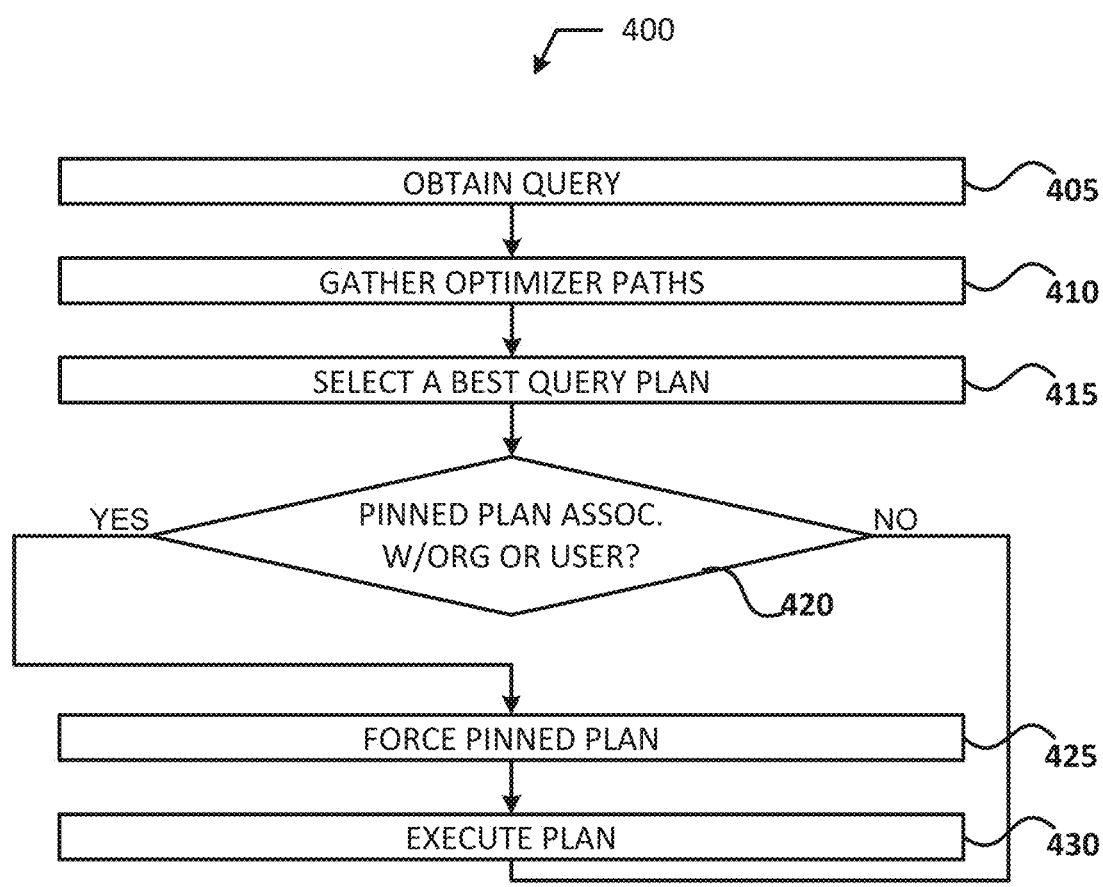
FIG. 3 illustrates a process for selecting query plans for execution in accordance with various embodiments.
Figure 4:
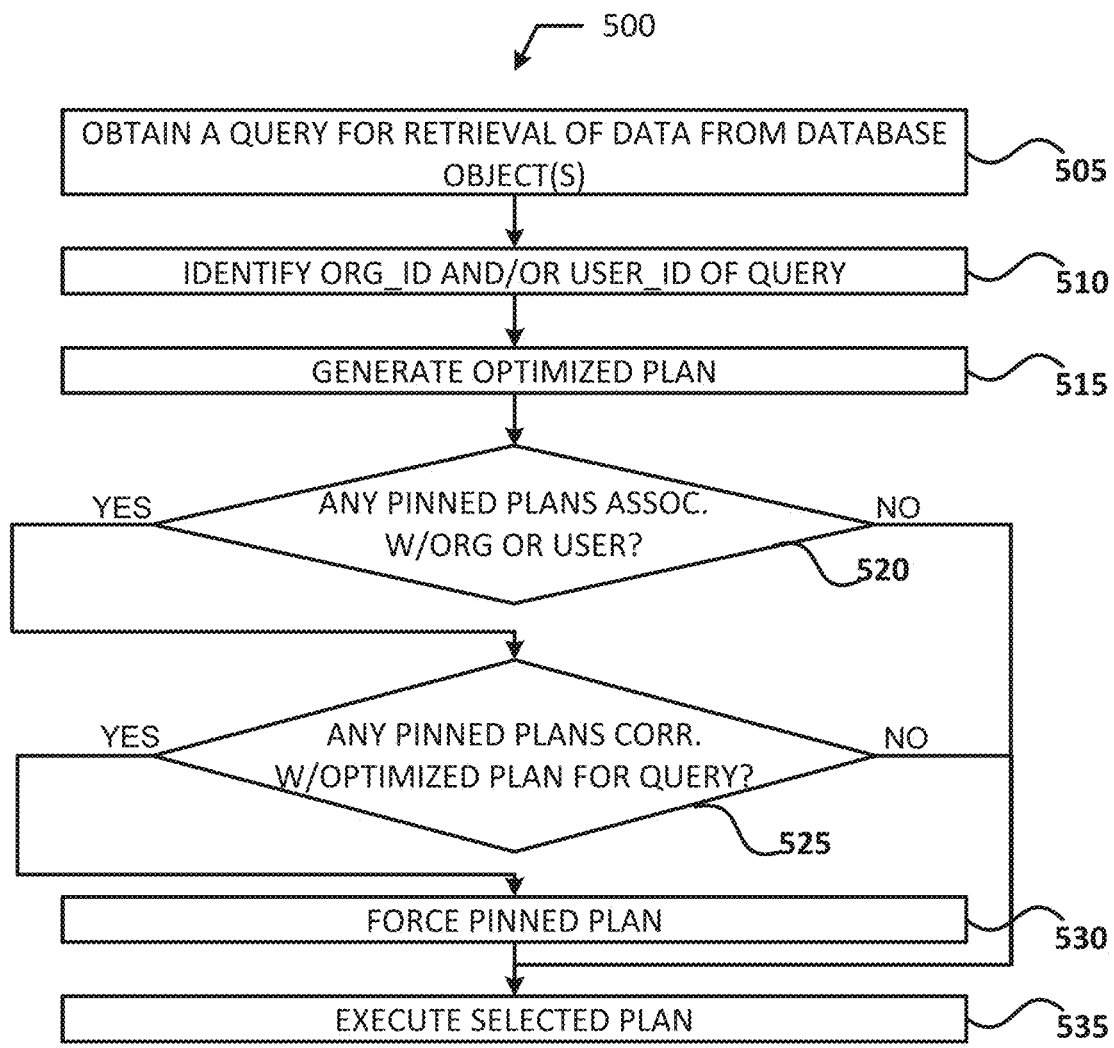
FIG. 4 illustrates another process for selecting query plans for execution in accordance with various other embodiments.

FIGS. 3-4 illustrates processes 400-500, respectively, in accordance with various example embodiments. For illustrative purposes, the operations of processes 400-500 are described as being performed by database system 16 discussed with regard to FIGS. 1A-B and 2. However, it should be noted that other computing devices may operate the process 400 in a multitude of implementations, arrangements, and/or environments. In embodiments, the database system 16 may include program code 26, which when executed by the processor system 17, causes the database system 16 to perform the various operations of process 300. While particular examples and orders of operations are illustrated in FIGS. 3-4, in various embodiments, these operations may be re-ordered, separated into additional operations, combined, or omitted altogether.

FIG. 3 shows a process 400 for selecting query plans for execution, in accordance with various embodiments. At operation 405, the processor system 17 may implement the query optimizer 308 to obtain a query. In embodiments, the query may be a query tree obtained from a parser 306, which may include filters 213 of a user-issued query 214.

At operation 410, the processor system 17 may implement the query optimizer 308 to gather optimizer paths, and at operation 415, the processor system 17 may implement the query optimizer 308 to select a "best" query plan, such as a lowest cost plan, etc., from the gathered optimizer paths. The optimizer paths gathered at operation 410 may comprise a set of query plans that may be used for execution of the obtained query 214, and the "best" query plan may be an optimized plan from among the set of query plans. It should be appreciated that the term "'best' query plan" may refer to an optimized plan that is more economical than other plans associated with the obtained query.

At operation 420, the processor system 17 may implement the query optimizer 308 to determine whether a pinned plan 216p is associated with a sql_id generated from the "best" query plan along with a user_id or an org_id of a user system 12 that issued the user-issued query 214. If at operation 420, the optimizer 308 determines that there are no pinned plans 216p associated with a the aforementioned sql_id along with the user_id or an org_id of the user system 12, then the optimizer 308 may proceed to operation 430 to execute the query plan by, for example, converting the user-issued query 214 into a native query 215 using the query plan selected at operation 415. If at operation 420, the optimizer 308 determines that there does exist such a pinned plan 216p, then the optimizer 308 may proceed to operation 425 to force the pinned plan by, for example, converting the user-issued query 214 into a native query 215 using the pinned plan 216p identified at operation 420. The optimized 308 may then proceed to operation 430 to execute the native query 215.

In various first embodiments, at operations 420-430 the query optimizer 308 may obtain an org_id and/or a user_id of the user system 12 from the user-issued query 214. In such embodiments, the query optimizer 308 may then proceed to choose an optimized plan among a set of query plans for the user-issued query 214. The query optimizer 308 may then obtain a query identifier (sql_id) of the optimized plan, such as by hashing the statements contained in the resulting native query based on the optimized plan (including the filter values of the filter 213), and may then lookup in the cache 317 if there exists a pinned plan 216p entry for the sql_id. In such embodiments, the optimizer 308 may use the matching pinned plan 216p to generate a query execution plan instead of using the optimized plan. After operation 430, the process 400 may end or repeat as necessary.

FIG. 4 illustrates a process 500 for selecting query plans for execution, in accordance with various other embodiments. Referring to FIG. 4, at operation 505, the processor system 17 may implement the query optimizer 308 to obtain a query for retrieval of data from one or more database objects 230. In embodiments, the query may be based on a user-issued query 214 that comprises a filter 213 to be used for retrieval of the data. At operation 510, the processor system 17 may implement the query optimizer 308 to identify an org_id and/or a user_id, which may have been extracted from the user-issued query 214 by the query engine 304 or some other component of the database system 16.

At operation 515, the processor system 17 may implement the query optimizer 308 to generate an optimized plan by applying various optimization functions as discussed previously. At operation 520, the processor system 17 may implement the optimizer 308 to determine whether any pinned plans 216p are associated with the optimized plan along with the org_id and/or the user_id. If at operation 515 the optimizer 308 determines that there are no pinned plans 216p associated with optimized plan and the org_id and/or user_id, then the optimizer 308 may proceed to operation 535 where the processor system 17 may implement the query optimizer 308 to control execution of the selected optimized query plan by, for example, passing the query execution plan to the query executor 310. If at operation 515 the optimizer 308 determines that there is a matching pinned plan 216p associated with the org_id or user_id, then the optimizer 308 may proceed to operation 530 to force the pinned plan 216p by, for example, generating the native query 215 using the pinned plan 216p for query 214.

At operation 525, the processor system 17 may implement the query optimizer 308 to determine whether any of the pinned plans 216p correspond with the optimized plan for query 214 generated at operation 515. If at operation 525 the optimizer determines that none of the pinned plans 216p correspond with the optimized plan for query 214, then the optimizer 308 may proceed to operation 535 where the processor system 17 may implement the query optimizer 308 to control execution of the optimized query plan by, for example, passing the query execution plan to the query executor 310. If at operation 525 the optimizer 308 determines that a pinned plan 216p correspond with the optimized plan for query 214, then the optimizer 308 may proceed to operation 530 to force the pinned plan 216p identified at operation 520. After forcing the pinned plan 216p, at operation 535 the processor system 17 may implement the query optimizer 308 to control execution of the selected query plan 216p by, for example, passing the pinned plan 216p to the query executor 310.

After execution of the selected query plan at operation 535, the process 500 may end or repeat as necessary.

FIG. 5 illustrates various instances of a graphical user interface (GUI) 500 for developing and pinning plans, in accordance with various embodiments. In embodiments, the GUI 500 may be referred to as a pin planner 500, and may be used to pin a pinned plan 216p to a query 214. As an example, the pin planner 500 of FIG. 5 shows indexed filters (or plans) 516p for a query 214: "select Id from Account where phone='5105198235'".

Referring to FIG. 5, the first instance 502 of the pin planner 500 shows an "Indexes" view of various plans including indexed filter 516p for the plan "ScanSelectiveFilter on table t" and a indexed filter 516r for the plan "ScanSelectiveFilter on table t cfdata". The first instance 502 of the pin planner 500 also shows, for each plan/filter, a description 513A-B of the indexed filter, a table or database object 230 to be searched using the indexed filter (e.g., database object "Account" in FIG. 5), a number of fields in the database object, a cardinality of each indexed filter (e.g., an estimated number of records that the indexed filter may return), a table or database object size, a threshold selectivity of each indexed filter (e.g., a percentage of the total records to be returned by the indexed filter), graphical control elements 510A-B for pinning the indexed filter to a particular organization (org_id), graphical control elements 511A-B for pinning the indexed filter to a user (user_id), and selection graphical control elements 512A-B for indicating a selection of one of the query plans 516p-r or an indexed filter (i.e., optimized plan) currently used by the optimizer 308 for the query 214. FIG. 5 shows the graphical control elements 510A-B and 511A-B as being buttons, however, in other embodiments other graphical control elements may be used to pin an indexed filter to a user or organization (e.g., check boxes, radio buttons/boxes, drop-down lists/menus, etc.). FIG. 5 also shows the graphical control elements 512A-B as being check boxes, however, in other embodiments other graphical control elements may be used to select an indexed filter (e.g., buttons, radio buttons/boxes, drop-down lists/menus, etc.). Furthermore, the first instance 502 of pin planner 500 also shows that plan 516p is currently pinned for a user and/or organization (e.g., indicated by the check mark in the "Used" field in FIG. 5). In this case, the optimizer 308 may choose the filter 516p "ScanSelectiveFilter on table t" optimization to generate the query execution plan when the query 214 is "select Id from Account where phone='5105198235'". It should be appreciated that a pinned plan 216p may be associated with an optimized plan along with a user_id and/or org_id for a particular query 214. If at a later point in time when the particular query 214 arrives at the database system 16, the optimizer 308 may choose a new optimized plan since the optimizer 308 may not be able to find the pinned plan 216p due to the pinned plan 216p corresponding with the old optimized plan and not the new optimized plan. In other words, the pinned plan 216p may naturally "expire," which can be beneficial, for example, in cases where a plan is pinned to overcome an optimizer bug. In such cases, when the optimizer bug is fixed, the optimizer 308 may no longer need to use the pinned plan 216p. In another example, the optimizer 308 may choose an optimized plan that was not previously available, which is more economical than the pinned plan 216p in that it may provide better execution performance than the previously pinned plan 216p. Therefore, the natural expiration of a pinned plan 216p may benefit system performance.

The second instance 504 of the pin planner 500 shows a "Pinned Plans" view of the filter 516r "ScanSelectiveFilter on table t cfdata", which may show various properties of the filter 216p. In embodiments, the second instance 504 may be generated in response to receipt of a user input indicating a selection of the filter 516r, such as a mouse click or finger tap on the description of the filter 516r. In such embodiments, the description of the filter 516r may be a link to the "Pinned Plans" view. In other embodiments, a drag and drop operation may be used to indicate the selection of the filter 516r, such as by dragging the filter 516r entry to a designated area of the GUI 500.

As shown, the second instance 504 of the pin planner 500 lists information for each listed plan. The actions 521 (e.g., including "view", "edit", and "delete" actions) may include graphical control elements that allow a user to view other information about the filter 516r, edit one or more entries of the indexed filter 516r, or delete the filter 516r. The sql_id 522 (listed in the "SqlId" field in FIG. 5) may be the hash value of the statements in the filter 516r. The user_id 523 (listed in the "User Id" field in FIG. 5) may be a unique identifier associated with the user system 12 to which the filter 516r is pinned. In embodiments, the user_id 523 may be a random number assigned to a user system 12 when the user system 12 is registered with the database system 16 and/or an organization, some other assigned number associated with a user of the user system 12 (e.g., a hashed or encrypted, social security number, Mobile Station International Subscriber Directory Number (MSISDN), and the like), or the user_id 523 may be a device identifier associated with a hardware component within the user system 12. Other methods for obtaining or producing the user_id 523 may be used.

The unique filtered index identifier (UFII) 526 (listed in the "Unique Identifier for filter" field in FIG. 5) may be a readable identifier associated with the filter 516*r*. In embodiments, the UFII 526 may be a combination of the description of the filter 516*r* (e.g., "ScanSelectiveFilter" or "ScanSelectiveFilter on"), an identifier of a database object 230 to be searched using the filter 516*r* (e.g., "table t" or "on table t"), and a field of the database object to be searched using the filter 516*r* (e.g., "cfdata"). In other embodiments, the UFII 526 may be a user generated identifier or may be generated using any other data associated with the filter 516*r*. The UFII 526 may also be referred to as a "pinned plan identifier" and the like. The query text 524 (listed in the "SQL text or query id" field in FIG. 5) may be the text of the applicable user-issued query 214 (e.g., "select Id from Account where phone='5105198235'") associated with the filter 516*r*. In the example shown by FIG. 5, the user-issued query 214 is in SOQL format, however, in other embodiments, the user-issued query 214 may be in any other object query language format, such as those mentioned previously. The query text 525 (listed in the "SQL text" field in FIG. 5) may be the text of the applicable native query 215. In the example shown by FIG. 5, the native query 215 is in SQL format, however, in other embodiments, the native query 215 may be in any other object query language format, such as those mentioned previously and/or a non-SQL (also referred to as "noSQL") format.

In addition, the second instance 504 of the pin planner 500 also includes a graphical control element 520, which is shown as a button in FIG. 5. Upon selection of the graphical control element 520, another instance of the GUI 500 may be displayed (not shown), which may include one or more additional graphical control elements (not shown) that may be used to create a new pinned plan 216*p*. Such additional graphical control elements may include one or more text boxes that allows a user to enter query text 524, query text 525, one or more user_ids 523 (e.g., a screen name, email address, etc.), and/or a UFII 526. The user_ids 523 may be selected using the graphical control element 528B, which upon selection may provide a list of various users. An org_id may also be selected using the graphical control element 528A, which upon selection may provide a list of organizations to which the filter 516*p* may be pinned. In embodiments, an org_id of a selected organization may be displayed in the "User Id" field, or the GUI 500) may include another field to display the org_id. In some embodiments, after the user enters the query text 524 and query text 525, the other fields shown by the second instance 504 may be automatically generated, such as by hashing the query text 524/525, obtaining a user_id 523 associated with an entered email address or user screen name, and/or the like. Furthermore, the user may also change the view of the GUI 500 using the graphical control element 527, or share the indexed filters using the graphical control element 528C.

After the user is finished viewing or editing the filter 516*r* using the second instance 504 of the pin planner 50X), a third instance 506 of the pin planner 500 may be displayed. The third instance 506 of the pin planner 500 may be the same as the first instance 502, however, the third instance 506 may show that plan 516*r* is now pinned for the user and/or organization (e.g., indicated by the check mark in the "Used" field in FIG. 5). In this case, the optimizer 308 may choose the filter 516*r* "ScanSelectiveFilter on table t cfdata" optimization as the query plan to generate a query execution plan for the query 214 "select Id from Account where phone='5105198235'" issued by the user system 12.

FIG. 6 illustrates an example schema 60X) for producing the pin planner 500 of FIG. 5, in accordance with various embodiments. The schema 600 may be a document (or collection of documents) expressing constraints about how the pin planner 500 should be constructed when rendered by the output system 12D or a user system 12. Schema 600 is shown as an Extensible Markup Language (XML) schema, however, other schema languages may be used, such as Document Type Definitions (DTDs), Relax-NG, Schematron, XSD (XML Schema Definitions), and the like. The schema 600 may indicate specific users that may view and/or edit the various pinned plans (e.g., using the "userAccess" and "editAccess" attributes within the "setupEntity" tag) and may also define the various fields discussed previously with regard to FIG. 5 (e.g., using the "setupField" tags and the "field" attributes in the "item" tags). Other schema configurations may also be used.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A computer program to be implemented by a user system, the computer program comprising a set of instructions stored on non-transitory memory and operable to:
   render an instance of a user interface comprising a set of graphical control elements;
   obtain a first user input via manipulation of a first graphical control element of the set of graphical control elements, the first user input indicating an organization identifier (org_id) to be used for obtaining data in response to a user-issued query;
   obtain a second user input via manipulation of a second graphical control element of the set of graphical control elements, the second user input indicating a user identifier (user_id) to be used for obtaining data in response to the user-issued query;
   obtain a third user input via manipulation of a third graphical control element of the set of graphical control elements, the third user input indicating the user-issued query;
   send, to a database system, a request to show a set of query plans considered by an optimizer for the user-issued query when the user-issued query is obtained from a user system associated with the org_id and the user_id; and
   the user interface comprises a table, the table including a record for each query plan of the set of query plans, each query plan is associated with individual fourth graphical control elements of the set of graphical control elements, and the individual fourth graphical control elements are used to pin an associated query plan to the org_id or the user_id for the user-issued query.

2. The computer program of claim 1, wherein the table further includes, for each query plan, a field for an associated unique filter identifier, wherein the unique filter identifier comprises a combination of a description of the query plan, an identifier of a database object to be searched, and a field of the database object to be searched.

3. The database system of claim 1, wherein the computer program comprises a set of instructions operable to:
   obtain a fourth user input via manipulation of a selected individual fourth graphical control element of the individual fourth graphical control elements;
   send, to the database system, a first message to pin a query plan associated with the selected individual fourth graphical control element to the org_id or the user_id for the user-issued query;
   obtain, from the database system, a second message including an indication that the query plan associated with the selected individual fourth graphical control element is a pinned plan;
   and render another instance of a user interface comprising the set of graphical control elements and the indication.

4. The database system of claim 1, wherein the table further includes, for each query plan, a field for an associated query identifier, a field for an associated user_id, a field for an associated org_id, a field for an associated user-issued query, and a field for a native query associated with the user-issued query.

* * * * *